Nov. 10, 1953  R. C. ALLEN ET AL  2,659,081
MULTIPLE CHANNEL RADIO SYSTEM
Filed Dec. 10, 1945

*INVENTORS*
RICHARD C. ALLEN
JACOB MILLMAN
BY William D. Hall.
*ATTORNEY*

Patented Nov. 10, 1953

2,659,081

UNITED STATES PATENT OFFICE 2,659,081

MULTIPLE CHANNEL RADIO SYSTEM

Richard C. Allen, Carthage, Mo., and Jacob Millman, Brookline, Mass., assignors, by direct and mesne assignments, to the United States of America as represented by the Secretary of War Application December 10, 1945, Serial No. 634,073

5 Claims. (Cl. 343—17.1)

This invention relates generally to electrical circuits and more particularly to a noise equalization circuit for the indicator of a multiple channel radio locating system.

In one type of radio object-locating system a series of pulses of R. F. energy is transmitted by one or more directive antennas, and echo pulses are received and applied to an indicating system in such a manner as to determine the position of the reflecting object which causes them. In such a system interference is often produced by trees, buildings, and other ground objects close to the transmitter which return echoes known as ground clutter. This ground clutter tends to obscure the indication of other objects at higher elevations but within the range to which ground clutter extends. To avoid interference from this source and at the same time to retain sensitivity for echoes from low lying objects beyond the range of ground clutter, some systems employ a plurality of directive beams of R. F. pulses lying one above the other in elevation but in the same vertical plane. Echoes from each of these beams are received, amplified, and detected in a separate receiver channel, and those lower channels which experience interference from ground clutter are blocked for the interval after each transmitted pulse during which echoes from ground objects are likely to be received. The remaining signals may be combined in various ways and presented on the indicator of the system.

When the video outputs of two or more of the receiver channels, which include video noise as well as echo pulses, are combined, the resulting average noise level on the indicator is the combination of the individual average noise levels of the separate channels. If the video output from a lower beam channel which is partially blanked to remove ground clutter interference is combined with the outputs of other channels to form the indicator presentation, an undesirable non-uniformity in background noise on the indicator is obtained, due to the total absence of output from the lower beam channel during the blanking period. In addition an undesirable voltage jump or step is produced in the combined video signal, due to the fact that the quiescent plate current flowing in the blanked stage is cut off during the blanking period.

It is therefore an object of the present invention to provide a novel means of preventing a non-uniformity of background noise from appearing on the indicator of a radio object-locating system employing multiple receiver channels and partial blanking of one or more channels. It is a further object to provide a means of preventing a voltage jump due to partial blanking from appearing in the combined video signals applied to the indicator of such a system.

The invention generally contemplates utilizing the blanking voltage pulse applied to the lower beam receiver channels of the system to produce a variaition in voltage applied to one or more stages of amplification in the unblanked receiver channels to regulate the gain of these channels.

Other objects, features and advantages of this invention will suggest themselves to those skilled in the art and will become more apparent from the following description of the invention taken in connection with the accompanying drawing in which.

Figure 1:
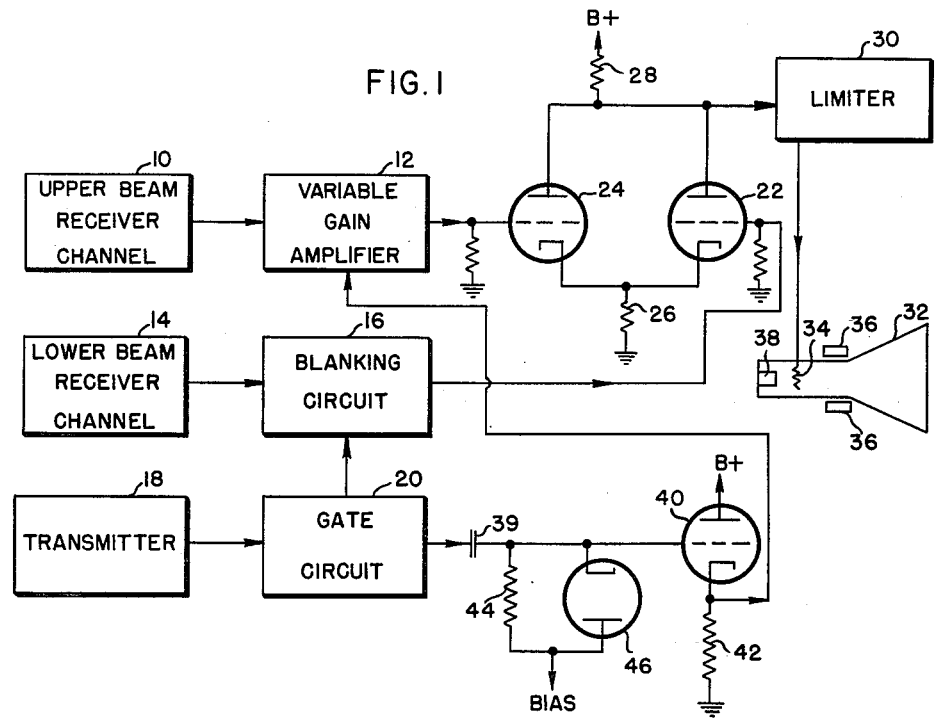
Fig. 1 is a diagrammatic representation of a portion of a system incorporating an embodiment of the present invention.

Reference is now made more particularly to Fig. 1, which for ease of explanation shows a system employing only two receivers. The video output of an upper beam receiver channel 10 is applied to a variable gain amplifier 12. Receiver channel 10 may be any radio receiver adapted to receive pulses of radio frequency energy and to produce therefrom a video output. Amplifier 12 may consist of a stage of video amplification, the gain of which may be varied by adjusting one of the quiescent electrode potentials, for example, the screen grid voltage. The lower beam receiver channel 14 may be similar to receiver channel 10, and the video output of the former is applied as an input signal to a blanking circuit 16, which may consist of a pentode amplifier stage so biased that it may be cut off or blanked by a positive voltage pulse applied to its cathode.

A transmitter 18 supplies a voltage pulse coincident with the transmitted pulse of the system to gate circuit 20. The latter may include a cathode-coupled or one-shot multivibrator, which requires a periodic trigger voltage pulse for proper operation and produces a rectangular wave output, the relative durations of the positive and negative portions of which may be controlled by varying the bias applied to one of the vacuum tubes in the circuit. For proper blanking to remove ground clutter interference, this bias should be continually proportional to the range to which ground clutter extends. One means of obtaining a bias voltage varying in this manner is described in the copending application by Jacob Millman, Serial No. 624,909, filed October 26, 1945, and issued as Patent No. 2,532,566 on December 5, 1950.

The rectangular gate voltage output of gate circuit 20 is applied as a blanking voltage to blanking circuit 16, the video output of which is applied to the grid of a triode 22. The video output of variable gain amplifier 12 is applied to the grid of a triode 24. Triodes 22 and 24 have a common cathode resistor 26 and a common plate resistor 28, and the combined output is applied through a limiter 30 to a cathode ray tube indicator 32. Limiter 30 may consist of a cutoff limiter, that is, a vacuum tube stage operated with such quiescent electrode potentials that signals of excessive magnitude drive the vacuum tube to or beyond cutoff.

In the preferred embodiment cathode ray tube indicator 32 may be of the plan position indicator (P. P. I.) type. In this type of indication, the electron beam is swept radially from the center of the tube to the periphery, and this trace is rotated about its point of origin in synchronism with the azimuthal rotation of the directive antenna of the system. Echo pulses are caused to intensify the electron beam at the time they are received, so that the range and azimuth of a reflecting object may be determined from the position of its indication on the screen of the indicator. For this type of presentation the video output from limiter 30 is applied to the control grid 34 of cathode ray tube 32. Cathode ray tube 32 also includes a beam deflection means 36 and a cathode 38.

The rectangular wave output of gate circuit 20 is also applied through capacitor 39 to a cathode follower triode 40, which has a cathode load resistor 42 and is supplied with a grid bias through the parallel combination of a resistor 44 and a diode 46, the cathode of the latter being connected to the grid of triode 40. The plate of triode 40 is connected directly to a regulated source of positive potential. In the preferred embodiment, the output of cathode follower triode 40 is applied to the screen grid of the vacuum tube of amplifier 12, to control the gain of this amplifier as described above.

Figure 2:
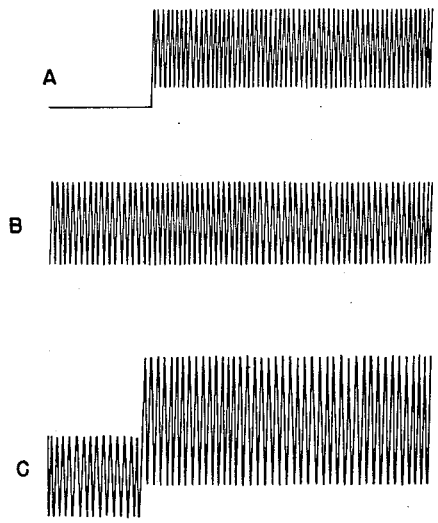
Fig. 2 shows the waveforms of the video noise outputs of the individual receiver channels and of the combined video noise output in a multiple-receiver system which does not incorporate the present invention.

The noise voltage waveforms shown in Fig. 2 are typical of those that would be obtained in a system such as that shown in Fig. 1 if the gain of amplifier 12 were maintained constant. For ease of illustration in Figs. 2 and 3 the noise voltage variations, which actually are entirely random fluctuations having only a relatively constant average level, are shown as approximately regular voltage variations of constant amplitude. This constant amplitude may be taken as indicative of the average amplitude of these noise voltages. To simplify the diagrams, video echo pulses have not been included in the waveforms shown.

The output of the lower beam receiver channel consisting of receiver 14 and blanking circuit 16, after inversion by triode 22, would be as shown in Fig. 2A. The rectangular voltage step at the left of the waveform occurs during the blanking period and is due to the total cutoff of plate current in the vacuum tube of blanking circuit 16 which is normally operated slightly above cutoff.

Fig. 2B shows the output of the unblanked upper channel as passed by triode 24, assuming the gain of the amplifier 12 is kept constant. The resulting combined output as applied to limiter 30 appears in Fig. 2C, and as can be seen, it contains the voltage step of Fig. 2A and a non-uniform average noise level, both of which are undesirable.

Figure 3:
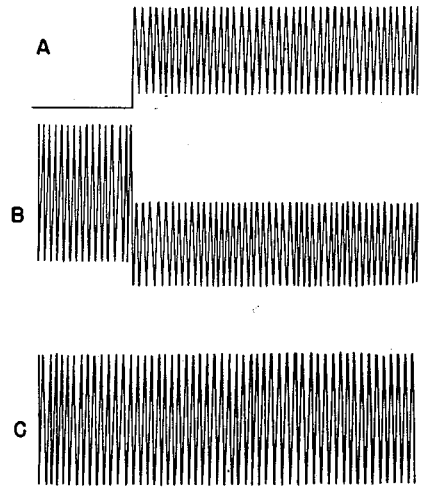
Fig. 3 shows the waveforms of Fig. 2 as they would appear in a system of the type shown in Fig. 1.

Fig. 3 shows the waveforms obtained when the circuit of Fig. 1 is operating properly. Each trigger pulse from transmitter 18 initiates a positive gate voltage pulse from gate circuit 20, which is applied to blanking circuit 16. The duration of this gate pulse may be varied as the azimuth of the directive antenna of the system changes, so that it is continually sufficient to blank all significant ground clutter, as explained in the aforementioned copending application. The output of the lower channel remains as before and is shown again for comparison in Fig. 3A.

The rectangular gate pulses from gate circuit 20 are also applied to the grid of cathode follower triode 40. The parallel arrangement of resistor 44 and diode 46 acts as a clamper and serves to stabilize the grid voltage of triode 40 between pulses at the value determined by the bias voltage supplied. If this circuit were not employed, the grid voltage would depend on the duration of the gate voltage pulses due to the averaging effect of capacitor 39. This stabilization is necessary, since the output of cathode follower 40 is applied directly to the screen grid of the vacuum tube of amplifier 12 and must be constant except for the period during which it is increased by a gate voltage pulse from gate circuit 20. When this pulse is present on the screen grid of the vacuum tube of amplifier 12, the gain of this stage is increased due to an increase of transconductance, and the average plate current is also increased. The resulting output from the upper beam receiver channel, after passing through amplifier 12 and triode 24, then appears as shown in Fig. 3B. If the amplitude of the screen voltage pulse is properly adjusted by a correct choice of the cathode resistor and plate voltage for triode 40, the combined video signal applied to limiter 30 will appear as in Fig. 3C. The non-uniform noise voltages of Figs. 3A and 3B are thus combined to effect the production of a uniform average noise level and to eliminate the voltage step of Fig. 3A. This combined video signal is then applied to limiter 30, in which signals of excessive amplitude are reduced, and the limited video output of this circuit is then applied to control grid 34 of cathode ray tube 32 to produce an indication such as previously described.

It will be obvious that the number of receiver channels may be increased according to the requirements of the system under consideration. More than one receiver channel may be blanked, and the gain of more than one channel may be periodically varied as described above to compensate for the blanking. Variable gain amplifier 12 may consists of more than one stage, and the gate pulse may be applied to more than one stage or may be applied to other electrodes than the screen grid.

While there has been described what is at present considered to be the preferred embodiment of this invention, it will be obvious to those skilled in the art that various changes and modifications may be made therein without departing from the scope of the invention as set forth in the appended claims.

The invention claimed is:

1. The combination including at least one radio pulse transmitter means, at least two radio pulse receiver means each having a video output, blanking means coupled to one of said receiver means for blanking off the video output thereof for a given interval of time, a variable gain video amplifier coupled to the other of said receiver means to vary the amplitude of the video output therefrom, a pulse generator responsive to a portion of the output of said transmitter means for generating a rectangular voltage blanking pulse and applying it to said blanking means, a source of constant magnitude direct voltage, means responsive to the output of said pulse generator for superimposing the blanking pulse output thereof upon said direct voltage of constant magnitude and applying the resultant voltage to said variable gain amplifier to increase the gain thereof and thus increase the amplitude of the output of said other receiver means during the time interval in which the video output of said one receiver means is blanked, both said receiver means being simultaneously operative at all times other than said given interval of time, an indicator, and means coupled to said blanking means and said variable gain amplifier for combining the outputs thereof and applying them to said indicator.

2. The combination including at least one radio pulse transmitter means, at least two radio pulse receiver channels, blanking means responsive to said transmitter means and coupled to only one of said receiver channels for blanking the output of said one channel for a given time interval, means coupled only to the other of said receiver channels for compensatorily increasing the gain thereof during the interval in which said one channel is blanked, both said channels being simultaneously operative at all times other than said given interval of time, an indicator, and means coupled to said receiver channels for applying the combined output of said channels to said indicator.

3. A multiple channel radio system, comprising a transmitter including means for supplying periodic pulses, a radiant energy receiver, a plurality of channels in said receiver, means for utilizing the output of said channels, means for combining the output of said channels and connected between said channels and said utilizing means, means controlled by said periodic pulses for blanking for a given interval of time at least one of said channels, said channels being simultaneously operative at all times other than said given interval of time, and means controlled by said periodic pulses for compensatorily varying the gain of at least one other of said channels during the time of blanking of said one channel.

4. A multiple channel radio system, comprising a transmitter including means for supplying periodic pulses, a radiant energy receiver, a pair of channels in said receiver, means for utilizing the output of said channels, means for combining the output of said channels and connected between said channels and said utilizing means, means controlled by said periodic pulses for blanking for a given interval of time one of said channels, both said channels being simultaneously operative at all times other than said given interval of time, and means controlled by said periodic pulses for compensatorily increasing the gain of the other one of said channels during the time of blanking of said one channel.

5. A multiple channel radio system, comprising a transmitter including means for supplying periodic pulses, a radiant energy receiver, a pair of channels in said receiver, a cathode ray oscillograph for utilizing the output of said channels, means for combining the output of said channels and connected between said channels and said cathode ray oscillograph, means controlled by said periodic pulses for blanking for a given interval of time the output of one of said channels, both said channels being simultaneously operative at all times other than said given interval of time, a source of direct current voltage, and means for adding the output of said blanking means to said direct current voltage for application to the other of said channels to compensatorily increase the gain of said other channel during the time of blanking of said one channel.

RICHARD C. ALLEN.
JACOB MILLMAN.

References Cited in the file of this patent

UNITED STATES PATENTS

| Number | Name | Date |
|---|---|---|
| 1,924,174 | Wolf | Aug. 29, 1933 |
| 2,189,317 | Koch | Feb. 6, 1940 |
| 2,400,641 | Hardy | May 21, 1946 |
| 2,403,562 | Smith | July 9, 1946 |
| 2,403,984 | Koenig, Jr. et al. | July 16, 1946 |
| 2,440,289 | Pensyl | Apr. 27, 1948 |
| 2,447,057 | Crosby | Aug. 17, 1948 |
| 2,464,353 | Smith et al. | Mar. 15, 1949 |
| 2,493,774 | Moore | Jan. 10, 1950 |
| 2,532,566 | Millman | Dec. 5, 1950 |